United States Patent [19]

Bradley

[11] Patent Number: 4,640,543
[45] Date of Patent: Feb. 3, 1987

[54] VEHICLE REAR SEAT SUN VISOR

[76] Inventor: John W. Bradley, 2461 66th Ter. South, St. Petersburg, Fla. 33712

[21] Appl. No.: 680,551

[22] Filed: Dec. 11, 1984

[51] Int. Cl.$^4$ .............................................. B60J 3/00
[52] U.S. Cl. ................................ 296/97 K; 296/97 B; 224/313
[58] Field of Search .................. 296/97 R, 97 C, 97 B, 296/97 F, 97 G, 97 H, 97 J, 97 K; 224/311, 312, 313; 248/293; 160/DIG. 3

[56] References Cited

U.S. PATENT DOCUMENTS

| | | | |
|---|---|---|---|
| 2,082,631 | 6/1937 | Johnson | 296/97 K |
| 2,594,813 | 4/1952 | Seibert | 296/97 R |
| 2,617,680 | 11/1952 | Knoblock | 296/97 K |
| 2,665,166 | 1/1954 | Roark | 296/97 C |
| 2,678,183 | 5/1954 | Bell | 296/97 K |
| 2,874,994 | 2/1959 | Chester | 296/97 C |
| 3,584,772 | 6/1971 | Robertson | 224/313 X |
| 3,779,501 | 12/1973 | Zibell | 224/311 X |

FOREIGN PATENT DOCUMENTS

| | | | |
|---|---|---|---|
| 800903 | 4/1935 | France | 296/97 K |
| 1245677 | 9/1971 | United Kingdom | 296/97 K |

Primary Examiner—Robert B. Reeves
Assistant Examiner—Russell D. Stormer
Attorney, Agent, or Firm—Walter J. Monacelli

[57] ABSTRACT

A sun visor for the rear seat side window made of relatively thin plastic or the like and being of substantially rectangular shape adapted to be mounted for support by the conventional coat hanger hook secured in the headliner of an automotive vehicle with the visor movable rotatably on said hook into and out of use position. The visor in its preferred embodiment can also be shifted axially relative to the hook, into desired position relative to the side of the vehicle on which it is mounted.

4 Claims, 4 Drawing Figures

U.S. Patent  Feb. 3, 1987  4,640,543

VEHICLE REAR SEAT SUN VISOR

BACKGROUND OF THE INVENTION

1. Field of the Invention

The invention relates to automotive vehicles and more particularly to a sun visor for the rear side window thereof.

2 State of the Prior Art

Although many prior art patents relate to sun visors for automotive vehicles only a few relate to inhibiting sun from shining into the side of vehicles into the rear seat thereof. U.S. Pat. Nos. 3,282,623 and 4,468,062 are representative of these patents by fall short of contemplating the present structure. Neither of these patents disclose or suggest association for support from the conventional coat hanger hook provided in present day vehicles.

SUMMARY OF THE INVENTION

The device covered hereby is a sun visor preferably substantially rectangular in shape adapted to be arranged to inhibit sunshine from bearing directly into the upper portion of the rear seat of an automotive vehicle in which it is installed. The visor is supported by the conventional coat hanger hook made a part of most rear seated vehicles and is adapted to be moved from a vertical extendible position parallel to the rear side window of the vehicle to inhibit the sun's direct rays, or to a substantially horizontal position adjacent the ceiling or headliner of the vehicle. Furthermore the visor is adapted to be moved as a unit axially so as to cover selected portions of the side windows of the vehicle, as desired.

The visor is preferably of rectangular shape and composed of a relatively thin material, such as plastic. Depending on preference the visor can be translucent or opaque.

An object of the invention is the provision of a vehicle rear seat sun visor that is simple in structure and effective in use.

Another object of the invention is the provision of a vehicle rear seat sun visor arranged in supported relation of the vehicle's conventional coat hanger hook.

A further object of the invention is the provision of a rear seat side window visor supported on a coat hanger hook for desired placement near or away from the side window.

DESCRIPTION OF THE PREFERRED EMBODIMENT

Figure 1:
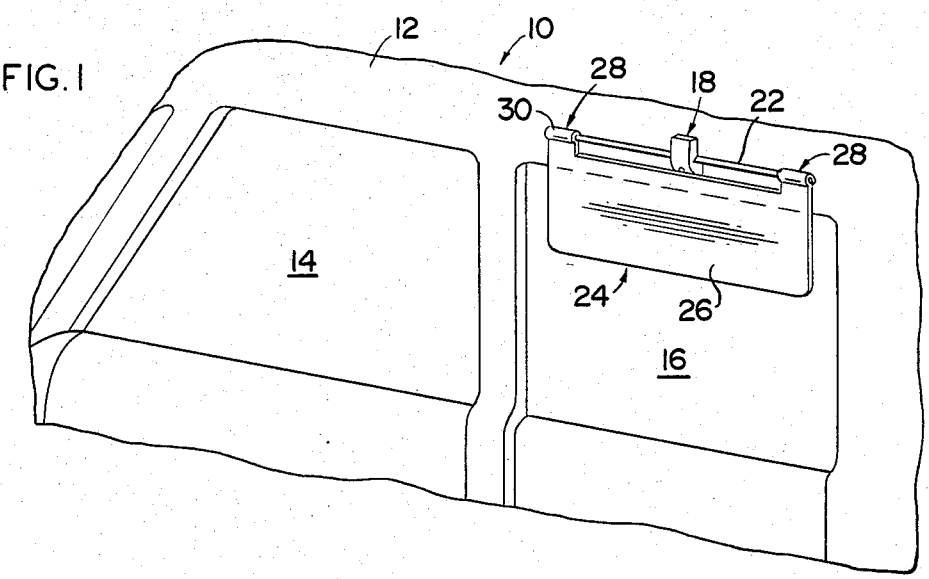
FIG. 1 is a fragmentary perspective view of a vehicle in which a sun visor constituting the invention is arranged.

FIG. 1 discloses the interior of an automotive vehicle 10 which includes a ceiling or headliner area 12, a front right side window 14 and a rear right side window 16.

A conventional coat hanger hook 18 is disclosed secured to the vehicle headliner by a screw or bolt 19 above the rear side window 16. The coat hanger hook 18 is modified as more clearly seen in FIG. 2 by the provision of a bore or hole 20 which is adapted to receive a rod or shaft 22 therethrough. The rod 22 forms a part of visor which is in the form of a panel member 26 of substantially rectangular shape. Panel member 26 includes a pair of upper extended flanges 28 on the top side thereof having tubular portion 30 receiving the oppsite end extremities of rod 22 in tight-fitting secured position therein.

Figure 2:
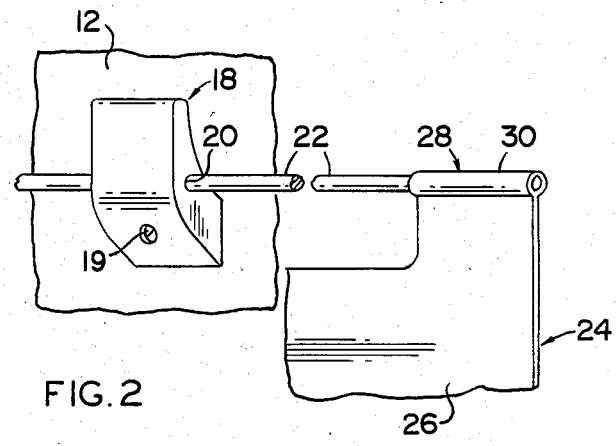
FIG. 2 is an enlarged perspective view of a portion of FIG. 1 illustrating the arrangement of the visor on the vehicle coat hanger hook.
Figure 3:
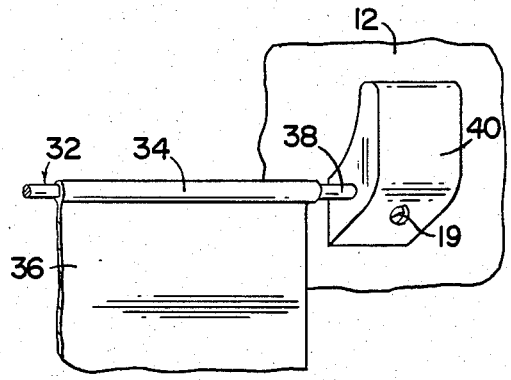
FIg. 3 is a partial perspective view of a modified mounting of a visor on a coat hanger hook.

FIG. 3 is a modified arrangement from that shown in FIGS. 1 and 2 in that a rod having the upper tubular portion 34 of panel member 36 secured thereon includes an axially extended portion 38 is pivotally secured in coat hanger hook 40. This arrangement is suitable when the coat hanger hook is arranged on the vehicle headliner at a point closer to the rear of the vehicle and near the rearmost point of the rear side window.

Figure 4:
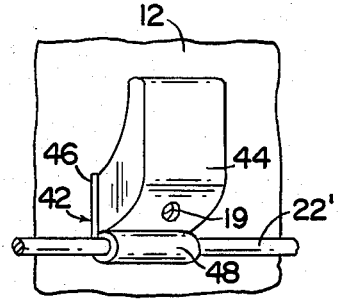
FIG. 4 is a perspective view of a modified visor support means differing from FIGS. 2 and 3.

FIG. 4 discloses a modified structure for supporting a rod 22 in comparison to FIGS. 1 and 2 through the provision of a bracket 42 secured by a conventional coat hanger hook 44 to the vehicle headliner. Bracket 42 includes a flange 46 disposed between the backside of hook 44 and the headliner and further includes a tubular portion 48 receiving rod 22' therein. Bracket 42 can be made of plastic or metal as desired.

Similarly to rod 22 of visor 24, rod 22' is adapted to be rotatable and axially slidable relative to bracket 42 and hook 44.

OPERATIONAL USE OF THE VISOR

Visor 24 as shown in FIGS. 1 and 2 has panel member 26 disposed in an in-use position with the panel member arranged substantially parallel relation to rear side window 16.

By fixedly securing the panel member 26 to rod 22 and permitting axial slidability and rotatability between rod 22 and its support position on hook 18 the panel member can be moved axially to the preferred position along the rear side window or into close out-of-use position adjacent the headliner.

A particular advantage of the visor of this invention is that it may be installed as original equipment in a vehicle or may be an added accessory easily installed after purchase of a vehicle. For example the modification of FIGS. 1-3 can be added by drilling a hole 20 in the conventional hook 18 provided with the vehicle to accommodate the insertion of rod 22, or the modification of FIG. 4 can be installed by unscrewing the bolt 19 holding the hook 18 to the headliner area 12 and inserting bracket 42 between hook 44 and headliner area 12 after which the bolt is reinserted and tightened. If the bolt is not long enough to accommodate the thickness of the bracket a bolt of greater appropriate length can be substituted for the original bolt.

Although specifics of construction are illustrated and defined, variations in structure are conceivable within the scope of the aforesaid description and accordingly, the appended claims are intended to clarify same.

My invention is thus claimed as follows:

1. A sun visor assembly for side rear windows of an automotive vehicle comprising a clothes hanger hook for securement to a vehicle headliner, a bracket rigidly secured by said hook having a tubular portion disposed adjacent to and under the base of the hook, a rod supported on the tubular portion of the bracket and a one piece panel member having spaced apart short vertically upward extending arms fixedly secured to the rod.

2. A rear side window automotive vehicle sun visor for support by a vehicle's conventional clothes hanger hook comprising a rod mounted for axial movement and rotation on said hanger and a single piece panel member having a portion of the top side thereof fixedly secured to the rod for movement therewith, said rod having one extremity thereof journalled for rotation on said hanger.

3. The sun visor of claim 2 in which the said rod is slidably mounted with respect to said hanger whereby the position of said rod may be axially adjusted with respect to said hanger.

4. a rear side window automotive vehicle sun visor assembly comprising a vehicle coat hanger adapted to be secured to the headliner of a vehicle above the rear side window, a rod axially and rotatably mounted on said hook and a panel member having the top side thereof secured to the rod, said panel member including a pair of flanges at opposite ends of the panel member providing an axial space therebetween with the rod fixedly secured to the flanges and extending axially therebetween with the support portion of the rod on the hook located in the axial space.

* * * * *

UNITED STATES PATENT AND TRADEMARK OFFICE
CERTIFICATE OF CORRECTION

PATENT NO.   : 4,640,543
DATED        : Feb. 3, 1987
INVENTOR(S)  : John W. Bradley It is certified that error appears in the above-identified patent and that said Letters Patent is hereby corrected as shown below:

Col. 1, line 14, correct "by" to read "but".

Signed and Sealed this

Eighth Day of September, 1987

Attest:

DONALD J. QUIGG

*Attesting Officer*  *Commissioner of Patents and Trademarks*